(12) United States Patent
Cebolla Garrofe

(10) Patent No.: US 11,518,067 B2
(45) Date of Patent: Dec. 6, 2022

(54) METHOD FOR FORMING FIBER COMPOSITE PREFORMS

(71) Applicant: AIRBUS OPERATIONS S.L., Madrid (ES)

(72) Inventor: Pablo Cebolla Garrofe, Collado Villalba (ES)

(73) Assignee: AIRBUS OPERATIONS S.L., Madrid (ES)

( * ) Notice: Subject to any disclaimer, the term of this patent is extended or adjusted under 35 U.S.C. 154(b) by 10 days.

(21) Appl. No.: 17/129,057

(22) Filed: Dec. 21, 2020

(65) Prior Publication Data

US 2021/0187787 A1    Jun. 24, 2021

(30) Foreign Application Priority Data

Dec. 20, 2019   (EP) ..................................... 19383157

(51) Int. Cl.
  *B29B 11/00*  (2006.01)
  *B29B 11/06*  (2006.01)
  *B29K 307/04* (2006.01)

(52) U.S. Cl.
  CPC .......... *B29B 11/06* (2013.01); *B29K 2307/04* (2013.01)

(58) Field of Classification Search
  CPC ................................. B29B 11/00; B29B 11/06
  See application file for complete search history.

(56) References Cited

U.S. PATENT DOCUMENTS

2006/0108057 A1* 5/2006 Pham .................... B29C 70/446
                                                       156/583.1
2017/0008217 A1* 1/2017 Chapman .............. B29C 70/462

FOREIGN PATENT DOCUMENTS

EP    3 000 586    3/2016
EP    3 115 185    1/2017

OTHER PUBLICATIONS

Search Report for EP19383157, dated Jul. 23, 2020, 6 pages.

* cited by examiner

*Primary Examiner* — Jacob T Minskey
*Assistant Examiner* — Matthew Hoover
(74) *Attorney, Agent, or Firm* — Nixon & Vanderhye P.C.

(57) ABSTRACT

A method for forming fiber composite preforms, the preform (1) include a web (2), a flange (3) and a bent part (2.1), and the method includes: laying-up a laminate (4) onto a tooling (5), the laminate (4) comprising lateral and transverse edges (4.1, 4.2) and the tooling (5) comprising a male part (7) comprising a surface (7.1) and a lateral wall (7.2), the web (2) being configured to be located over the surface (7.1) of the male part (7) and the flange (3) being configured to be located over the lateral wall (7.2) of the male part (7); forming the preform (1) over the male part (7); clamping the lateral edges (4.2) of the laminate (4) to the tooling (5) such that the web (2) and the flange (3) of the laid-up laminate (4) are kept under tensional loads, and bending a longitudinal portion of the male part (7).

15 Claims, 8 Drawing Sheets

METHOD FOR FORMING FIBER COMPOSITE PREFORMS

RELATED APPLICATION

This application claims priority to European Patent Application 19383157-5, filed Dec. 20, 2019, the entirety of which is incorporated by reference.

FIELD

The invention relates to a method for forming composite preforms with aggressive bends, e.g., convex zones.

BACKGROUND

When using conventional forming methods to manufacture preforms, bends in the preform may result in kinks or wrinkles where the bend is an aggressive convex or curved shape.

The preforms may have flanges. At bends in the preforms, the flanges may wrinkle due to the bend applied to the preform. In particular, convex curves in a flange of the preform is susceptible to forming kinks and wrinkles.

The preforms are typically formed from laminates, such as sheets of composite plies of carbon fibers and resin. The laminates are applied to male tools, e.g., mandrels that are often C-shaped or L-shaped in cross section. The flanges of the preform are typically formed where the laminate overlaps a sidewall(s) of the male tool. When the male tool is bent along a longitudinal axis, the laminate/preform also bends. At the bend, an outside flange surface of the laminate/preform forms a concave curve and an inside flange surface forms a convex curve. The laminate/preform forming the convex curve tends to wrinkle or kink when the male tool bends. The wrinkles and kinks are generally smoothed before the preform is cured into a final shape. Smoothing wrinkles and kinks is difficult and some wrinkles and kinks may appear in the final preform shape.

Wrinkles appear in the kink area due to excess laminate material at the convex curve. A conventional technique to remove wrinkles is to cutout portions of the plies of the laminate to remove material the might wrinkle. But, this technique cuts the fibers of the laminate material which can weaken the flange.

SUMMARY

The invention disclosed herein may be embodied as a method for forming a preform from a layup laminate without wrinkles. The method enables preforms having complex geometries to be formed without wrinkles. In particular, the geometries of the preforms that may be formed include: (i) convex flanges with bends which would conventionally result in wrinkles in the flange at the bend, and (ii) double curvature preforms from laminates.

The method of the invention uses the concept of neutral axis, which is an axis of a cross section of a beam (a member resisting bending) or shaft along which there are no longitudinal stresses or strains. If the cross section is symmetric, isotropic and is not curved before a bend occurs, then the neutral axis is at the geometric centroid. The fibers on one side of the neutral axis are in a state of tension, while those on the opposite side are in compression. The fibers in compression tend to wrinkle when the preform bends along a longitudinal axis, while the fibers in tension tend not to wrinkle.

The method of the invention displaces the neutral axis below the flanges by placing the entire preform under tension. The method forms the preform while the fibers of the entire web and flange of the preform are under tension. Due to the tension on all fibers in the preform, no wrinkles form when the preform is bent into its final shape.

The method of the invention may be embodied to form fiber composite preforms, such as preforms comprising a web and at least a flange, a longitudinal axis and at least a bent part with respect to said longitudinal axis.

A method embodying the invention includes:

A) Laying-up a laminate on tooling. The composite laminate may be plies of carbon or glass fibers with a resin. The laminate has lateral edges and transverse edges. The tooling comprises a male part comprising a surface having a first surface, such as a flat upper surface, at least a lateral wall extending from the first surface along a lateral corner of the male tool. The portion of the laminate covering the first surface may form a web of the preform. The portions of the laminate covering the lateral walls of the male too form the flanges of the preform.

B) Clamp the lateral edges of the laminate to the tooling such that the web and the flange of the laid-up laminate are in tension, such as along an direction perpendicular to a longitudinal axis of the male part of the tool;

C) Bend the male part with respect to the longitudinal axis to form a bend in the preform, and D) Cure the preform such as with heat and/or pressure to activate the resin in the preform and solidify the preform.

The method allows preforms having complex geometries to be formed without wrinkles in bends of the preform.

SUMMARY OF FIGURES

To complete the description and provide for a better understanding of the invention, drawings are provided. The drawings form an integral part of the description and illustrate a preferred embodiment of the invention. The drawings comprise the following figures.

DETAILED DESCRIPTION

Figure 1:
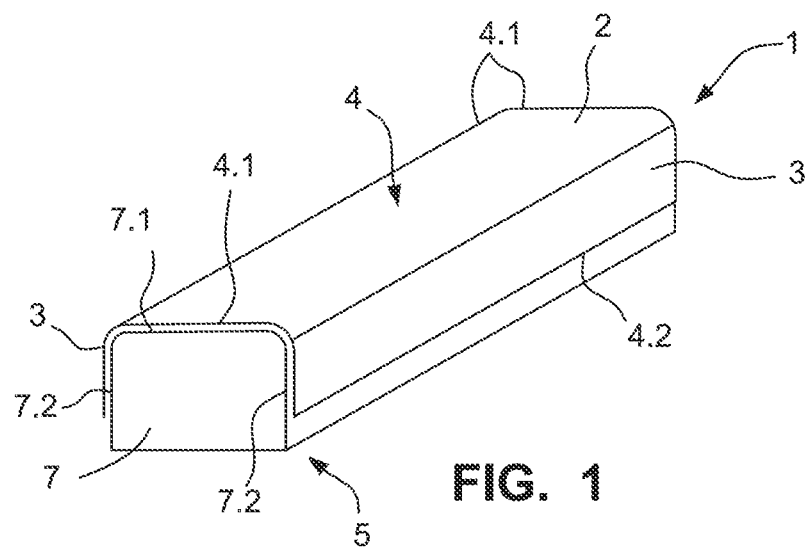
FIG. 1 shows a schematic perspective view of a C-shaped preform located onto the male part of an embodiment of a tooling.

FIG. 1 discloses a preform having a C-shaped cross section. Alternatively, the preform may have an L-shaped cross section or other cross-sectional shape. FIG. 1 shows the preform before it is bent using the methods disclosed herein. The initial shape of the preform, e.g., before it is bent, may be a straight beam as shown in FIG. 1 or may be another shape such as an arch shape along a longitudinal direction of the preform.

To form the preform (1), a laminate (4), e.g., layer(s) of carbon or glass fibers impregnated with a resin, are laid-up on tooling (5). The laminate (4) has transverse edges (4.1) and lateral edges (4.2). The lateral edges (4.2) of the laminate (4) will form the edges of lateral borders, e.g., walls, of the C shaped preform. The lateral edges extend the longitudinal length of the preform. The transverse edges (4.1) of the laminate will form the transverse edges at ends of the preform. A web region of the laminate, e.g., along a longitudinal center of the preform, will form the web (2) of the preform. The web is adjacent and between the lateral border regions of the laminate. Before being applied to the tooling, the laminate may be a flat panel of plies of carbon or glass fibers with resin.

The tooling (5) comprises a male part (7) having a first surface (7.1), e.g., an upper flat center surface, and at least one lateral wall (7.2) attached at or integral to a longitudinal corner between the lateral wall and the first surface. The lateral wall(s) may be substantially perpendicular, e.g., within five degrees, of the first surface.

The laminate (4) is laid on the male part (7), e.g. a male tooling mandrel, such that a portion of the laminate corresponding to the web (2) of the preform (1) is located over the first surface (7.1) of the male part (7) and a portion(s) of the laminate corresponding to the flange (3) of the preform is/are located over the lateral walls (7.2) of the male part (7). As shown in FIG. 1, the first surface (7.1) of the male part (7) is flat and forms an upper surface bridging the lateral walls (7.2) which are also flat.

Figure 2:
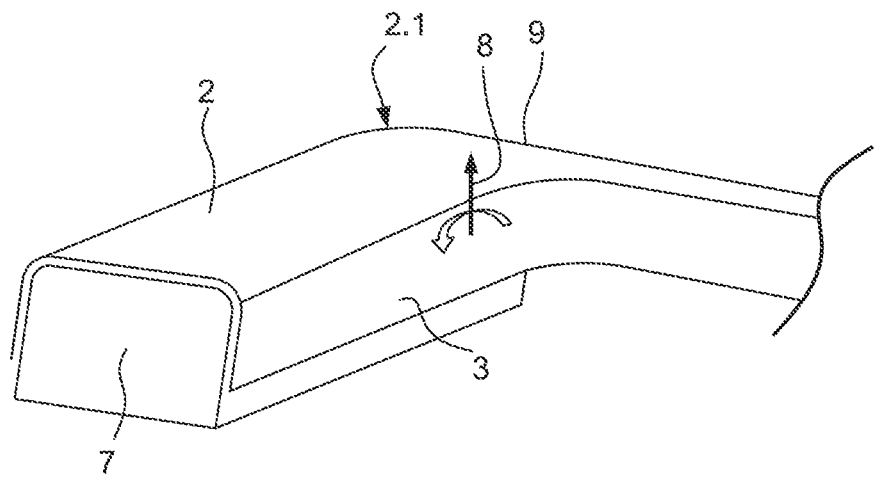
FIG. 2 shows a schematic perspective view of the C-shaped preform of FIG. 1 at a final bent position.

FIG. 2 discloses a conventional approach in which the preform (1) and male part (7) are bent about an axis (8) which results in a bent part (2.1) of the preform with a kink, e.g., wrinkling, in the preform. Specifically, in the embodiment disclosed in FIG. 2, the bent part (2.1) is bent around an axis transverse to a plane of the flange (3). A kink, e.g., wrinkling, results due to the bending of the laminate/preform. The preform in FIG. 2 is not under tension while the preform and male tool are bent.

Figure 3:
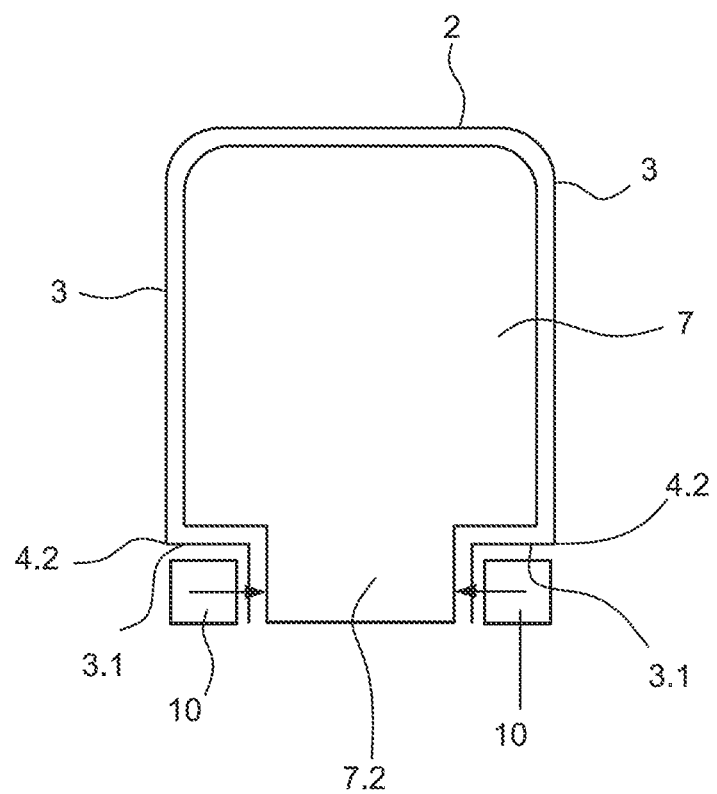
FIG. 3 shows a cross-sectional view of the C-shaped preform of FIG. 1 located over the male part in a clamped position.

FIG. 3 discloses an embodiment of the invention in which a clamping system (10) applies tension to the preform laid-up on the male tool. The clamping system acts on the lateral edges (4.2) of the laminate (4) to clamp these edges to the male tool and pull the laminate taught against the outer surfaces of the male tool and place the laminate under tension. The flanges (3) of the laminate/preform include an extra length lateral areas (3.1). The extra length lateral areas extend beyond the lateral edges (4.2) of the preform. The extra length lateral areas (3.1) may be removed after the preform is form.

The extra length lateral areas (3.1) are clamped against the male part (7) by bar clamps (10). The bar clamps (10) extend longitudinal along the extra length lateral areas (3.1) of the preform and press the extra length area (3.1) against the male part (7). The two clamps push (see opposing arrows in FIG. 3) the extra length area (3.1) of the lateral edges (4.2) into transversal recesses in the lateral walls (7.2). By pushing the extra length areas (3.1) into the recesses, the laminate (4), including the (3) flange and web (2) placed in tension by the clamps (10). Due to the tension, the laminate is held under a tensional load along a transverse direction, e.g., perpendicular to a longitudinal axis of the tool (7). The tensional loads applied to the preform assists in avoiding wrinkles when the preform is later bent.

Figure 11A:
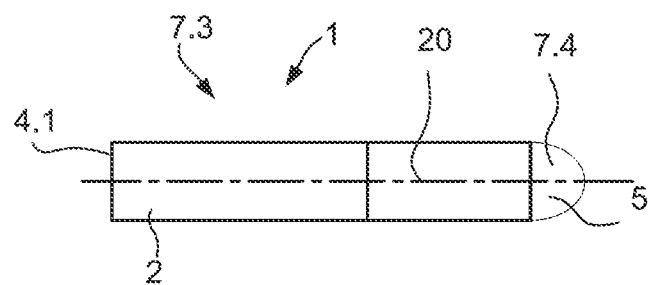
FIGS. 11A and 11B show schematic plan views of a C-shaped preform in two positions, a first position (FIG. 11A) with no bent of the preform and a second position (FIG. 11B) wherein the preform is bent around an axis transversal to the plane of the flange.
Figure 11B:
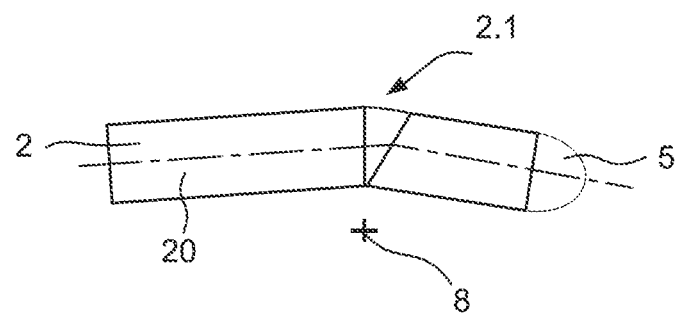
Figure 12A:
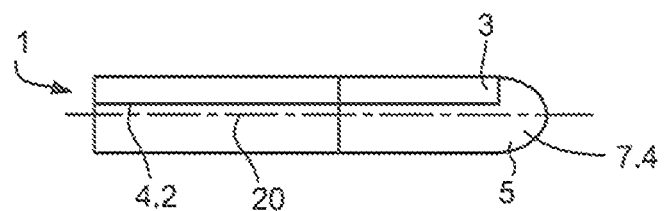
FIGS. 12A and 12B show a schematic plan view of a C-shaped preform in two positions, a first position (FIG. 12A) with no bent of the preform and a second position (FIG. 12B) wherein the preform is bent around an axis transversal to the plane of the web.

FIGS. 11A and B and FIGS. 12A and B disclose two embodiments of a bent preform (1). In FIG. 11B, the preform (1) is bent around an axis (8) transverse to a plane of the web (2). The bent preform has a curved convex geometry in a top down view shown in FIG. 11B. The preform (1) in FIGS. 12A and B has a flange (3) and is also bent around an axis (8).

In FIGS. 11A, B and 12A, B, the male part (7) of the tool comprises a first part (7.3) and at least one second articulated part (7.4) that pivots about and end of the first part. In a first position (FIGS. 11A and 12B), the laid-up laminate (4) is laminated such that the longitudinal axis (20) of both parts (7.3, 7.4) form a straight line. In the final step (FIGS. 11B and 12B) of the process, the articulated part (7.4) is moved with respect to the first part (7.3) and a bent part (2.1) is made in the preform (1). The first part (7.3) and the second articulated part (7.4) comprise surfaces that receive the laid-up laminate. Initially (see FIGS. 11A, 12B), the first and second parts (7.3, 7.4) of the male tool are initial aligned along a straight longitudinal axis. The laminate is applied to the mail tool while the first and second parts are aligned along the longitudinal axis and there are no bends in the tool along the longitudinal axis. Specifically, in the initial position, the outer longitudinal surfaces of the first part (7.3) and the second part (7.4) are flush and in common planes. The flush manner may be that the first part and second part are aligned along a straight longitudinal axis and the side and upper surfaces of the first and second parts are in common planes. In the second step of the process (see FIGS. 11B, 12B), the articulated part (7.4) is moved with respect to the first part (7.3) with respect to a longitudinal axis such that the male part (7) has a bent part (2.1) between the first and second parts (7.3, 7.4)

In FIG. 11A, the laminate (4) is applied to the male part (7) and conforms to the shape of the tool to, for example, have a C-shape cross section of the preform. The first part (7.3) and the second articulated part (7.4) comprise surfaces configured to receive the laid-up laminate (4). As shown in FIG. 11B, the male part (7) and the laminate are bent by pivoting the second articulated part (7.4) with respect to the first part (7.3). A bent part (2.1) of the preform is between parts which are not bent. If the preform is not held in tension before the male tool is bent, a kink may form in the preform in the bent part (2.1).

Figure 12B:
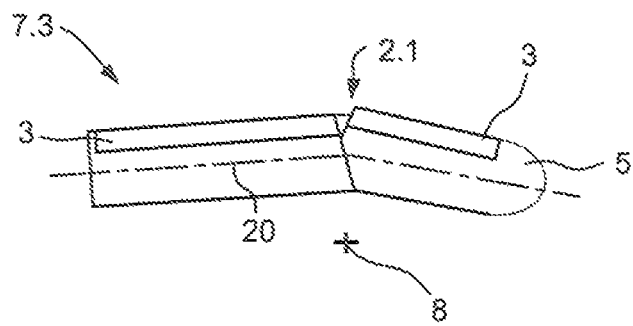

FIGS. 12A and 12B disclose a lateral view of a preform (1) which is bent around an axis (8) transverse to a plane of the flange (3). If the preform is not held in tension before the male tool is bent, a kink (2.1) can form in the flange of the C-shape preform (1).

FIGS. 4 to 10 disclose another embodiment of the tooling (5). A base part (6) of the tooling (5) comprising a surface (6.1) that may be flat and has a slot. The male part (7) of the tool is positioned in the slot and is movable with respect to an upper surface (6.1) of the base part (6). The male part (7) is displaced in a direction perpendicular to a plane of the surface (6.1) of the base part (6). The male part (7) is mounted to a base plate (12) below the base surface (6.1) and within a housing (18) of the base part (6). The base plate (12)

is supported by columns (13) in the base part (6). The base plate and/or columns are motorized such that the base plate moves up and down to move the male part (7) part in a direction perpendicular to the surface (6.1). When retracted, the base plate moves the male part (7) into the slot of the base surface (6.1) such that the upper surfaces (7.1) of the first and second parts (7.3, 7.4) are flush, e.g., substantially aligned with the plane of the base surface (6.1). While the upper surfaces (7.1) of the male tool are aligned with the surface (6.1) of the base surface, the male tool and base parts are in position to receive the laminate (1). In the embodiment shown in the figures, the surfaces (6.1, 7.1) are flat but other embodiments of the invention may have these surfaces curved depending on the preform to be fabricated.

Figure 5:
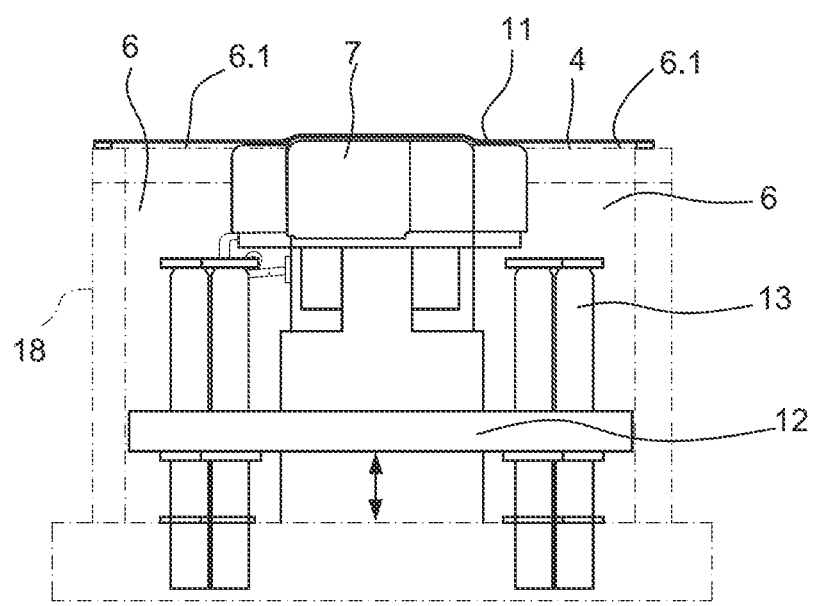
FIGS. 5 to 9 show cross-sectional views of the tooling of FIG. 4 in subsequent steps of an embodiment of the method object of the invention. As in FIG. 4, portions of the housing are shown in dotted lines to illustrate the male tool and base plate.

Laying-up a laminate (1) onto the tooling (5) according to the FIGS. 4 to 10 comprises the following steps:

(A) Laying-up a laminate (4) over the surfaces (6.1, 7.1) of the base part (6) and of the male part (7), while the male part is flush with the surface (6.1) of the base part (6). Covering the laminate (4) and surface (6.1) with a gas impervious membrane (11), as shown in FIG. 5.

Figure 6:
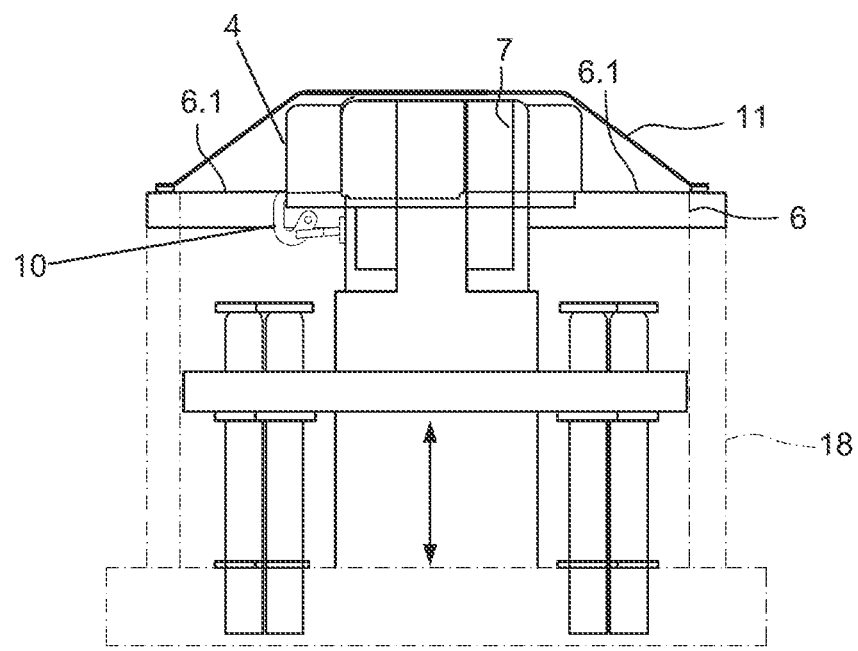

(B) Moving the male part (7) of the tooling (5) with respect to the base part (6), such as by elevating the tooling with respect to the base part. The base part (6) is elevated by moving up along the columns (13), such as by turning one or more of the columns or by turning a nut(s) on the base part which engages threads on the column(s). See FIG. 6. As the tooling (5) rises from the surface (6.1) of the base part, the membrane (11) and laminate (4) may be partially stretched as shown in FIG. 6 such that the flange (3) is molded from the layup laminate (4) into the lateral walls (7.2) of the male part (7). The membrane may be sealed to the laminate and the base part, such as by applying a vacuum through ports in the surface (6.1).

Figure 7:
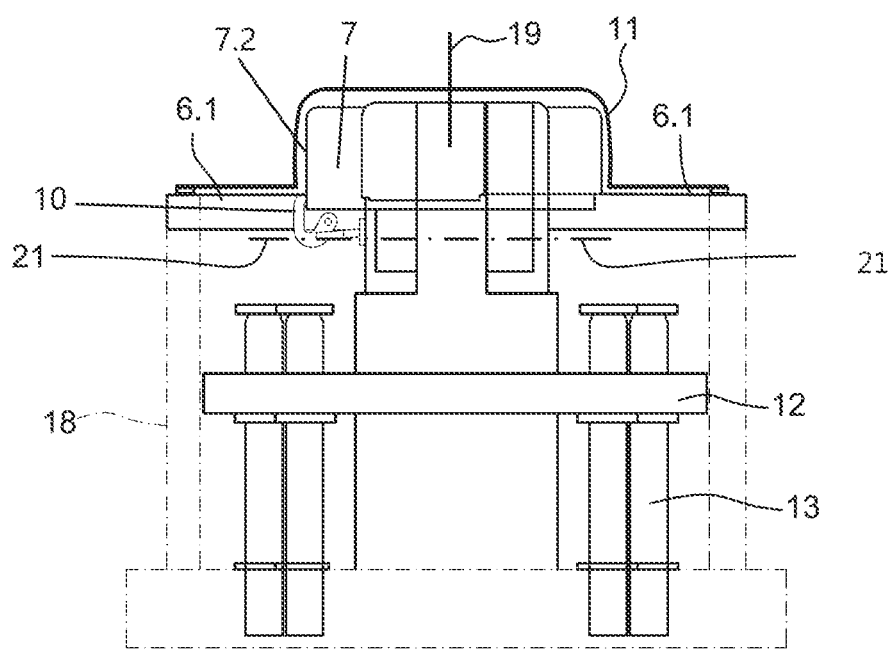

As shown in FIGS. 6 and 7, the laid-up laminate (4) is pulled against the outer surfaces of the male part (7) of the tooling. Clamps (10) may be applied to the lower lateral edges (4.1) of the laminate (4) to clamp these lateral edges to the male part. As shown in FIG. 3, the clamp (10) may press the lower lateral edges, e.g., extra length areas (3.1), into longitudinal recesses of the male tool adjacent the lower lateral edges of the male tool. The engagement of the clamps (10) pushes the laminate into the recesses and applies a tension to the laminate along a direction transverse to a longitudinal axis of the male tool.

While FIG. 7 shows a clamp (10) only pivoting against one of the lateral walls, there may also be a second clamp (10) the pivots to engage a longitudinal recess in an opposite lateral wall (7.2) of the male tool. The clamp (10) may be a general C-clamp which extends a length of the male tool. The clamp (10) is mounted to the base part (6) such that it pivots open to receive a lateral edge of the laminate and pivots close to push the lateral edge of the laminate against the side of the male tool. The clamp (10) may be inside of the membrane (11) and pivotably mounted to a sidewall portion of the base part (6) just below the male tool portion (7).

Figure 4:
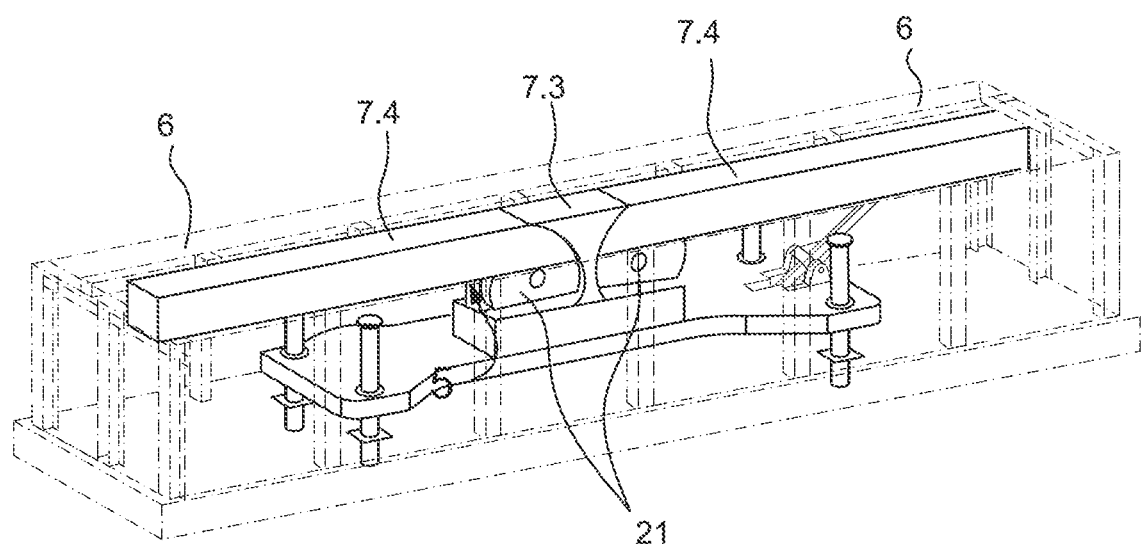
FIG. 4 shows a perspective view of an embodiment of a tooling, wherein portions of the housing of the tooling is shown in dotted lines to better show the male tool and supporting base plate.

As disclosed in FIG. 4, the male part (7) comprises a first part (7.3) and at least one second articulated part (7.4) pivotably attached to the first part (7.3). The first part (7.3) may allow the articulated part (7.4) to pivot with respect to an axis 21 (see FIG. 7) and/or about an axis (19). The pivoting of the articulated part(s) (7.3) forms a bend in the preform. During the bending, the preform is under tension to avoid wrinkles in the bent portion of the preform.

As can be seen in FIGS. 5 to 10, both the first part (7.3) and the second articulated part (7.4) comprise flat surfaces configured to receive the laid-up laminate located in a flush manner during the step of lying-up the laminate (4) as can be seen in FIG. 5, for instance.

The forming process of the embodiment is performed by bagging. Specifically, the membrane (11) is located over the laminate (4) and sealed to the tooling (5). The membrane (11) covers the surfaces (7.1, 6.1) of the male part (7) and of the base part (6). The tooling (5) is additionally able to vary the pressure under the membrane (11) to form the preform. For this reason, the membrane (11) and tooling (5) provide airtight conditions, e.g., vacuum conditions, over the laminate.

Additionally, the tooling (5) may be self-heated to allow heating under vacuum conditions of the laminate to achieve binder activation within the laminate. The heating and binder activation cures the laminate into the shape of the preform. Device or elements sensitive to temperature shall be correctly isolated to avoid damaging during heating.

After the laminate is cured into the shape of the preform, the clamp (10) is removed from the preform and the extra length area (3.1) may be removed from the preform.

Other alternatives to the forming process are possible, for instance, by applying pressure to the web (2) and flanges (3) of the preform by a tooling instead by bagging.

FIG. 6 discloses the step in which the male part (7) is raised with respect to the base part (6). Thus, the membrane (11) is elongated due to the push of the male part (7) on the membrane (11). The flanges (3) of the laid-up laminate (4) are then deposited over the lateral walls (7.2) of the male part (7).

FIG. 7 represents the forming step in which the air pressure under the membrane (11) is lowered to form the preform (1). Therefore, the membrane (11) is sucked in such a way that it is fixed on the male part (7) and the laminate (4) is formed.

Figure 8:
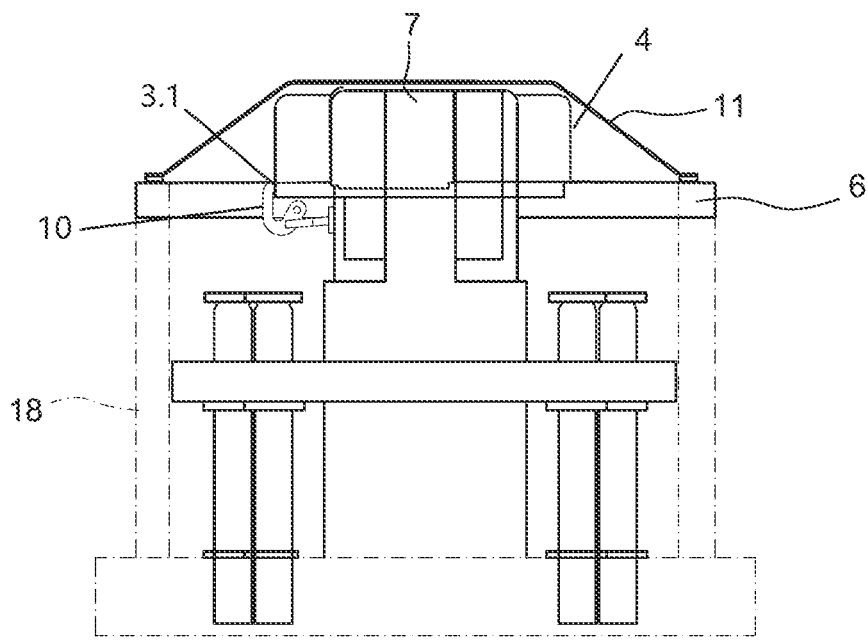
Figure 9:
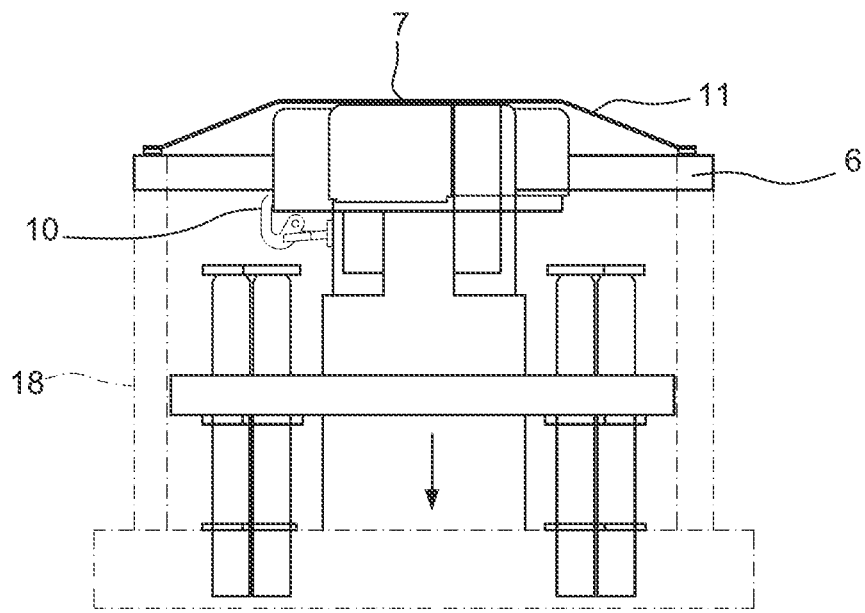
Figure 10:
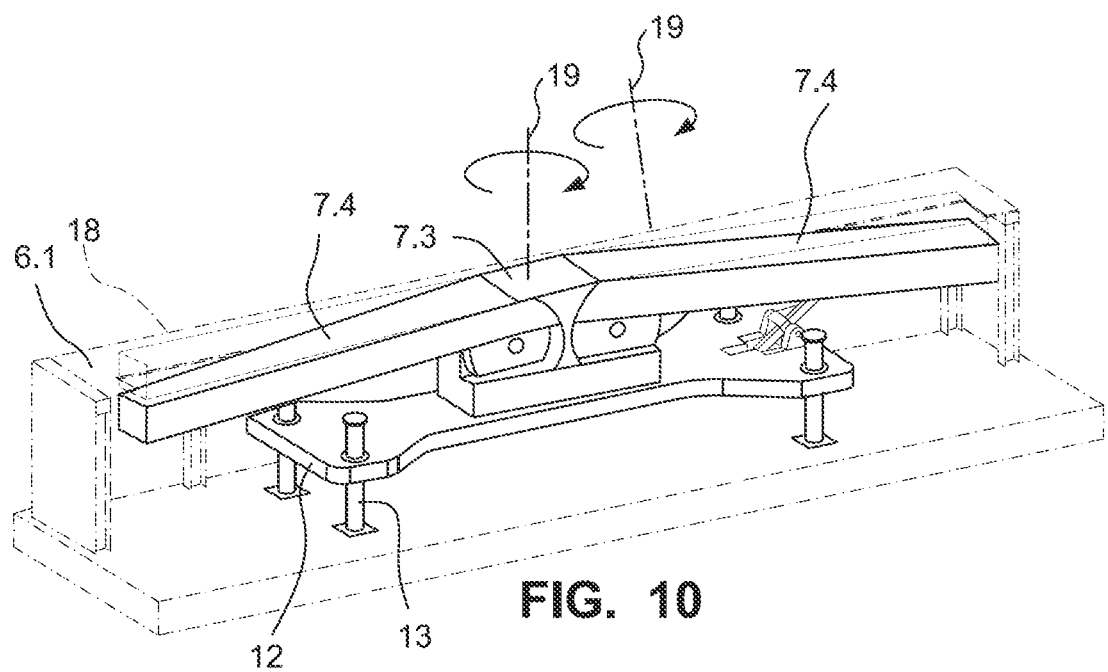
FIG. 10 shows a perspective view of the tooling of FIG. 4 at a final bending step of the method.

In the step shown in FIG. 8, the air pressure is raised from the pressure to form the preform (1) and the membrane (11) is released and afterwards, as can be seen in FIG. 9, the male part (7) is lowered.

The lateral edges (4.2) of the laminate (4) are clamped to the tooling (5) such that the web (2) and the flange (3) of the laid-up laminate (4) are kept under tensional loads. Specifically, the tooling (5) comprises clamps (10) as can see in FIG. 9.

The lateral edges (4.2) can also be clamped at this stage or, alternatively, they can be clamped before the forming step or they are not clamped in the whole process.

Finally, the articulated parts (7.4) of the tooling (5) are moved with respect to the first part (7.2) and the C-shaped preform (1) is kinked.

The laid-up laminate (4) comprises a plurality of layers. The method may comprise the step of cutting at least one of the layers of the laid-up laminate (4) in the area of the bent part (2.1) in a direction transversal to the longitudinal axis (20) of the preform (1). This is called darting or interlaminate-cutting. In other words, cutting, totally or partially, a layer or layers of the laminate (4) at one point to allow unidirectional fibers to open. In this way, gaps between the layers are introduced, especially in the 0 direction of the laminate.

These contiguous cut layers can be placed adjacent before bending the preform (1) so that there is a gap between them after bending the preform (1). Alternatively, the contiguous cut layers can be overlapped so that after bending the preform (1) there is no gap between them. In another embodiment, the contiguous cut layers can be overlapped so that after bending the preform (1) there is a certain degree of overlapping between the two adjacent layers.

The method disclosed herein may be embodied to include darting to improve flange (3) discontinuity to avoid tension and fiber breakage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for forming a fiber composite preform, wherein the fiber composite preform includes a web and at least one a flange and a bend in the preform along a longitudinal axis of the preform, the method comprises:
    laying a laminate on tooling, wherein the laminate includes longitudinal edges and transverse edges, and the tooling includes a male part comprising a first surface and at least one lateral wall, wherein a portion of the laminate laid-up on the first surface forms the web of the preform and a portion of the laminate laid-up on the at least one lateral wall forms the at least one flange,
    securing the transversal edges of the laminate to the first surface and the at least one lateral wall such that the laminate is held under tension over the tooling; and
    while the laminate is held under tension, bending the laminate and the male part with respect to a longitudinal direction of the male part to form the bend in the preform.

2. The method according to claim 1, wherein the tooling further comprises a base part comprising a base surface, the male part being movable with respect to the base part in a direction perpendicular to the base surface, and the step of laying-up a laminate includes:
    laying the laminate over the base surface and the male part,
    after the laying the laminate, moving the male part with respect to the base part and thereafter performing the securing step.

3. The method according to claim 2, wherein the base surface of the base part and the first surface of the male part are flush in a common plane during the step of the laying the laminate.

4. The method according to claim 1, wherein the laminate is a sheet of fiber and resin plies and the sheet includes regions from which is formed the web and the flange.

5. The method according to claim 1, wherein the at least one lateral wall includes opposing lateral sidewalls, and the step of securing includes clamping the longitudinal edges of the laminate to the opposing lateral sidewalls.

6. The method according to claim 5, wherein the opposing lateral sidewalls each have a recess, and the clamping includes clamping each of the longitudinal edges into a respective one of the recesses.

7. The method according to claim 6, wherein the longitudinal edges of the laminate are edges of an extra length longitudinal area of the laminate, and the step of clamping each of the longitudinal edges into the respective recess includes claiming the longitudinal area into the respective recess.

8. The method according to claim 1, wherein the step of bending the laminate and the male part includes bending the male part and the laminate about an axis transverse to the first surface of the male part.

9. The method according to claim 2, wherein the step of bending the laminate and the male part about an axis perpendicular to the base surface.

10. The method according to claim 1, wherein the male part comprises a first longitudinal part and a second articulated longitudinal part pivotably connected to the first longitudinal part and the step of bending the laminate and the male part is performed by pivoting the second articulated longitudinal part with respect to the first longitudinal part.

11. The method according to claim 10, wherein while the first longitudinal part and the second articulated longitudinal part are aligned along a straight longitudinal axis before the step of bending, outer surfaces of the first longitudinal part are aligned with outer surfaces of the second articulated longitudinal part.

12. The method according to claim 1, wherein the laminate includes plies of carbon fiber and resin, and the method further comprises removing a portion of at least one of the plies in an area of the ply corresponding to where a bend is to be formed during the bending step.

13. The method according to claim 2, further comprising:
    applying a gas impervious membrane over the laminate and the base surface after the step of laying the laminate and before the step of moving the male part, and
    sealing the membrane to the base surface while the membrane is over the laminate and the male part.

14. The method according to claim 13, wherein the step of sealing the membrane includes reducing a pressure between the membrane and the base surface.

15. The method according to claim 14, further comprising raising a pressure between the membrane and base surface before the step of securing the transversal edges.

* * * * *